US006488827B1

(12) United States Patent
Shartle

(10) Patent No.: US 6,488,827 B1
(45) Date of Patent: Dec. 3, 2002

(54) CAPILLARY FLOW CONTROL IN A MEDICAL DIAGNOSTIC DEVICE

(75) Inventor: Robert Justice Shartle, Livermore, CA (US)

(73) Assignee: Lifescan, Inc., Milpitas, CA (US)

( * ) Notice: Subject to any disclaimer, the term of this patent is extended or adjusted under 35 U.S.C. 154(b) by 0 days.

(21) Appl. No.: 09/541,132

(22) Filed: Mar. 31, 2000

(51) Int. Cl.[7] .......... G01N 27/327

(52) U.S. Cl. .......... 204/403; 204/409; 422/82.01; 422/100

(58) Field of Search .......... 204/403, 409, 204/400; 422/81, 82, 100, 102, 61, 82.01

(56) References Cited

U.S. PATENT DOCUMENTS

| | | | | |
|---|---|---|---|---|
| 4,224,125 A | | 9/1980 | Nakamura et al. | |
| 4,233,029 A | | 11/1980 | Columbus | |
| 4,254,083 A | | 3/1981 | Columbus | |
| 4,426,451 A | | 1/1984 | Columbus | |
| 4,545,382 A | | 10/1985 | Higgins et al. | |
| 4,868,129 A | | 9/1989 | Gibbons et al. | |
| 4,946,795 A | * | 8/1990 | Gibbons et al. | 422/100 |
| 5,230,866 A | | 7/1993 | Shartle et al. | 422/103 |
| 5,256,376 A | * | 10/1993 | Callan et al. | 356/246 |
| 5,472,603 A | | 12/1995 | Schembri | |
| 5,627,041 A | | 5/1997 | Shartle | |
| 5,698,406 A | * | 12/1997 | Cathey et al. | 422/55 |
| 5,700,695 A | | 12/1997 | Yassinzadeh et al. | |
| 5,736,404 A | | 4/1998 | Yassinzadeh et al. | |
| 5,885,527 A | | 3/1999 | Buechler | |
| 5,912,134 A | | 6/1999 | Shartle | |
| 5,997,817 A | | 12/1999 | Crismore et al. | 422/58 |
| 6,001,307 A | | 12/1999 | Naka et al. | 422/81 |
| 6,193,873 B1 | * | 2/2001 | Ohara et al. | 204/400 |
| 6,261,519 B1 | * | 7/2001 | Harding et al. | 422/58 |

FOREIGN PATENT DOCUMENTS

| | | |
|---|---|---|
| EP | 0803288 A | 10/1997 |
| WO | WO 97/18464 | 5/1997 |
| WO | WO 9807019 A | 2/1998 |

* cited by examiner

*Primary Examiner*—Robert J. Warden, Sr.
*Assistant Examiner*—Kaj K. Olsen

(57) ABSTRACT

A medical diagnostic device for measuring an analyte concentration in a sample of a biological fluid includes a capillary flow channel in the device to convey the sample from an inlet to a second region. The flow channel has a capillary dimension in at least one direction. A stop junction in the flow channel has a boundary region that has a dimension that is greater in that direction and forms an angle that points toward the sample inlet.

10 Claims, 5 Drawing Sheets

CAPILLARY FLOW CONTROL IN A MEDICAL DIAGNOSTIC DEVICE

CROSS-REFERENCE TO PRIOR APPLICATION

This application relates to U.S. application Ser. No. 09/333,793, filed Jun. 15, 1999 (now U.S. Pat. No. 6,193, 873).

BACKGROUND OF THE INVENTION

1. Field of the Invention

This invention relates to a medical diagnostic device that includes an element for controlling fluid flow through the device; more particularly, to a device that facilitates fluid flow through a stop junction.

2. Description of the Related Art

A variety of medical diagnostic procedures involve tests on biological fluids, such as blood, urine, or saliva, to determine an analyte concentration in the fluid. The procedures measure a variety of physical parameters—mechanical, optical, electrical, etc.,—of the biological fluid.

Among the analytes of greatest interest is glucose, and dry phase reagent strips incorporating enzyme-based compositions are used extensively in clinical laboratories, physicians' offices, hospitals, and homes to test samples of biological fluids for glucose concentration. In fact, reagent strips have become an everyday necessity for many of the nation's estimated 16 people with diabetes. Since diabetes can cause dangerous anomalies in blood chemistry, it can contribute to vision loss, kidney failure, and other serious medical consequences. To minimize the risk of these consequences, most people with diabetes must test themselves periodically, then adjust their glucose concentration accordingly, for instance, through diet, exercise, and/or insulin injections. Some patients must test their blood glucose concentration as often as four times or more daily.

One type of glucose measurement system operates electrochemically, detecting the oxidation of blood glucose on a dry reagent strip. The reagent generally includes an enzyme, such as glucose oxidase or glucose dehydrogenase, and a redox mediator, such as ferrocene or ferricyanide. This type of measurement system is described in U.S. Pat. No. 4,224,125, issued on Sep. 23, 1980, to Nakamura et al.; and U.S. Pat. No. 4,545,382, issued on Oct. 8, 1985, to Higgins et al., incorporated herein by reference.

Hodges et al., WO 9718464 A1, published on May 22, 1997, discloses an electrochemical device for measuring blood glucose that includes two metallized polyethylene terephthalate (PET) layers sandwiching an adhesive-coated PET intermediate layer. The metallized layers constitute first and second electrodes, and a cutout in the adhesive-coated layer defines an electrochemical cell. The cell contains the reagent that reacts with the glucose in a blood sample. The device is elongated, and the sample is introduced at an inlet on one of the long sides.

The electrochemical devices for measuring blood glucose that are described in the patents cited above, as well as other medical diagnostic devices used for measuring analyte concentrations or characteristics of biological fluids, generally share a need to transport the fluid from a sample inlet to one or more other sections of the device. Typically, a sample flows through capillary channels between two spaced-apart surfaces. A number of patents, discussed below, disclose medical diagnostic devices and include descriptions of various methods to control the flow of the sample.

U.S. Pat. No. 4,254,083, issued on Mar. 3, 1981, to Columbus, discloses a device that includes a sample inlet configured to facilitate movement of a drop of fluid sample into the device, by causing a compound meniscus to form on the drop. (See also U.S. Pat. No. 5,997,817, issued on Dec. 7, 1999 to Crismore et al.)

U.S. Pat. No. 4,426,451, issued on Jan. 17, 1984 to Columbus, discloses a multi-zone fluidic device that has pressure-actuatable means for controlling the flow of fluid between the zones. His device makes use of pressure balances on a liquid meniscus at the interface between a first zone and a second zone that has a different cross section. When both the first and second zones are at atmospheric pressure, surface tension creates a back pressure that stops the liquid meniscus from proceeding from the first zone to the second. The configuration of this interface or "stop junction" is such that the liquid flows into the second zone only upon application of an externally generated pressure to the liquid in the first zone that is sufficient to push the meniscus into the second zone.

U.S. Pat. No. 4,868,129, issued on Sept. 19, 1989 to Gibbons et al., discloses that the back pressure in a stop junction can be overcome by hydrostatic pressure on the liquid in the first zone, for example by having a column of fluid in the first zone.

U.S. Pat. No. 5,230,866, issued on Jul. 27, 1993 to Shartle et al., discloses a fluidic device with multiple stop junctions in which the surface tension-induced back pressure at the stop junction is augmented; for example, by trapping and compressing gas in the second zone. The compressed gas can then be vented before applying additional hydrostatic pressure to the first zone to cause fluid to flow into the second zone. By varying the back pressure of multiple stop junctions in parallel, "rupture junctions" can be formed, having lower maximum back pressure.

U.S. Pat. No. 5,472,603, issued on Dec. 5, 1995 to Schembri (see also U.S. Pat. No. 5,627,041), discloses using centrifugal force to overcome the back pressure in a stop junction. When flow stops, the first zone is at atmospheric pressure plus a centrifugally generated pressure that is less than the pressure required to overcome the back pressure. The second zone is at atmospheric pressure. To resume flow, additional centrifugal pressure is applied to the first zone, overcoming the meniscus back pressure. The second zone remains at atmospheric pressure.

U.S. Pat. No. 6,011,307, issued on Dec. 14, 1999, to Naka et al., published on Oct. 29, 1997, discloses a device and method for analyzing a sample that includes drawing the sample into the device by suction, then reacting the sample with a reagent in an analytical section. Analysis is done by optical or electrochemical means. In alternate embodiments, there are multiple analytical sections and/or a bypass channel. The flow among these sections is balanced without using stop junctions.

U.S. Pat. No. 5,700,695, issued on Dec. 23, 1997 to Yassinzadeh et al., discloses an apparatus for collecting and manipulating a biological fluid that.uses a "thermal pressure chamber" to provide the driving force for moving the sample through the apparatus.

U.S. Pat. No. 5,736,404, issued on Apr. 7, 1998, to Yassinzadeh et al., discloses a method for determining the coagulation time of a blood sample that involves causing an end of the sample to oscillate within a passageway. The oscillating motion is caused by alternately increasing and decreasing the pressure on the sample.

None of the references discussed above suggest a device in which a flow channel has a stop junction that is angular in the flow direction.

SUMMARY OF THE INVENTION

This invention provides a medical diagnostic device for measuring an analyte concentration in a biological fluid. The device comprises a capillary flow channel within the device, in fluid communication with a sample inlet, the flow channel a) adapted for conveying a sample of the biological fluid in a first direction, from a first region, proximate to the sample inlet, to a second region, distal to the sample inlet, the first region having a capillary dimension in a second direction, substantially perpendicular to the first direction; and b) having a stop junction, comprising a boundary region that i) separates the first and second regions, ii) has a predetermined dimension in the second direction that is greater than the capillary dimension, and iii) forms an angle that points toward the first region.

Note that in the present specification and the figures, capillaries are shown bounded by parallel plates. In that case, the "second direction", which has the capillary dimension, is uniquely determined. Alternatively, capillaries of the invention could be cylindrical. In that case, the second direction is radial, in a planar circle, or disk, that is perpendicular to the direction of fluid flow.

Devices of the present invention provide, in a flow channel of the device, a stop junction that is angular in the flow direction. Such a stop junction can be designed with readily-controlled break-through pressure.

DETAILED DESCRIPTION OF THE INVENTION

When fluid flows through a channel, a discontinuity in channel cross section can form a "stop junction," which can stop the fluid flow, as described in U.S. Pat. Nos. 4,426,451; 5,230,866; and 5,912,134, incorporated herein by reference. The stop junction results from surface tension that creates a back pressure that stops the fluid meniscus from proceeding through the discontinuity. The stop junction is weakened, and flow thereby enhanced, when the leading edge of the meniscus encounters the vertex of an acute angle and is then stretched along the arms of the angle. This may be described as the angle "pointing" in a direction opposite to the direction of fluid flow.

This invention relates to a medical diagnostic device that has a flow channel with a stop junction. The stop junction is angular in the direction of flow, which permits fluid in the channel to break through the stop junction when there is a predetermined pressure difference across the stop junction. The advantages of such a controlled break-through stop junction are apparent from the description that follows.

Figure 1:
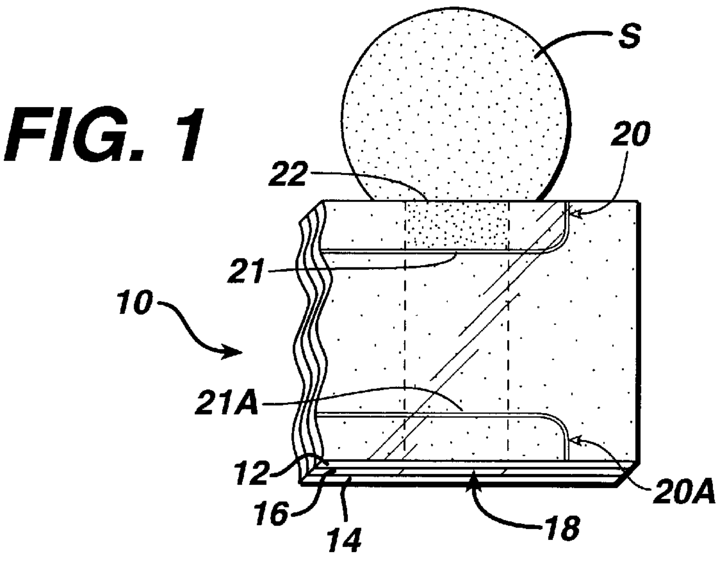
FIG. 1 depicts the operation of a stop junction in a medical device.

FIG. 1 depicts part of a medical diagnostic strip 10 that is a multilayer sandwich. Top layer 12 and bottom layer 14 sandwich intermediate layer 16. A cutout in intermediate layer 16 forms channel 18. Lines 20 and 20A are scored into the bottom surface of layer 12 and form in channel 18 stop junctions 21 and 21A, respectively. Thus, sample S, introduced into channel 18 at sample inlet 22, stops when it reaches stop junction 21.

Figure 2:
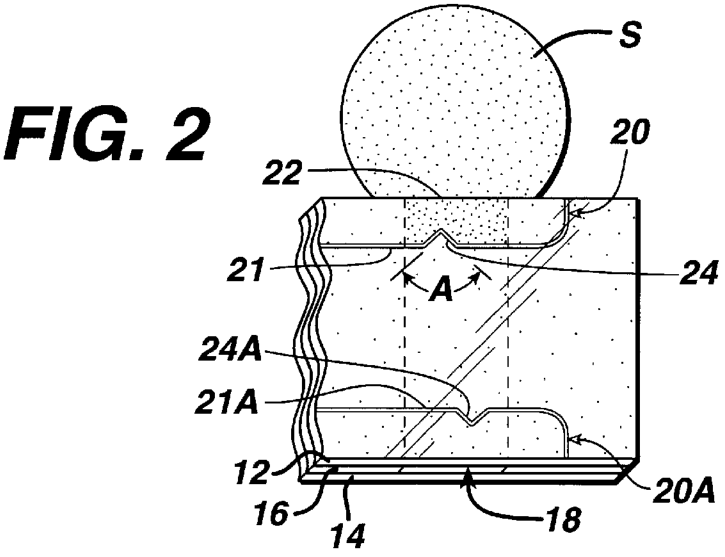
FIGS. 2–5 depict the flow of a fluid in part of a device of this invention.
Figure 3:
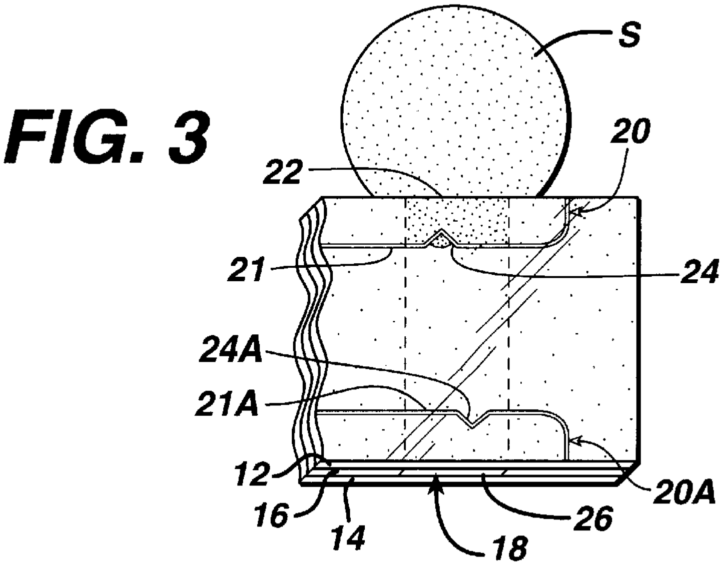

FIGS. 2 and 3 depict the part of a medical diagnostic strip of FIG. 1 in which stop junctions 21 and 21A have been modified by adding serrations 24 and 24A, respectively. Serration 24 forms an acute angle A that "points" toward sample inlet 22. FIGS. 2 and 3 depict sample S just before and just after it breaks through stop junction 21, respectively. Note that the breakthrough occurs first at the vertex that points opposite to the direction of fluid flow. The effectiveness of the serration in enhancing flow through a stop junction in a capillary channel depends on the angle and the length of the legs that form the angle. The smaller the angle and the longer the legs, the greater the effectiveness of the serration. Thus, if the angle is small and the legs long, only a small hydraulic pressure differential across the scored region will cause the sample to flow through it. Preferably, angle A is less than about 90° and its axis of symmetry is aligned with the direction of flow in the channel.

Stop junction 21A has an angle that points toward end 26 of channel 18 that is opposite inlet 22, and it would have reduced resistance to the flow of sample that entered end 26. If the stop junction is to have reduced resistance to flow that enters either end of channel 18 and flows to the other end, then preferably both stop junctions 21 and 21A have more than one serration, with at least one pointing in each direction (as shown in FIGS. 6 and 7).

Figure 4:
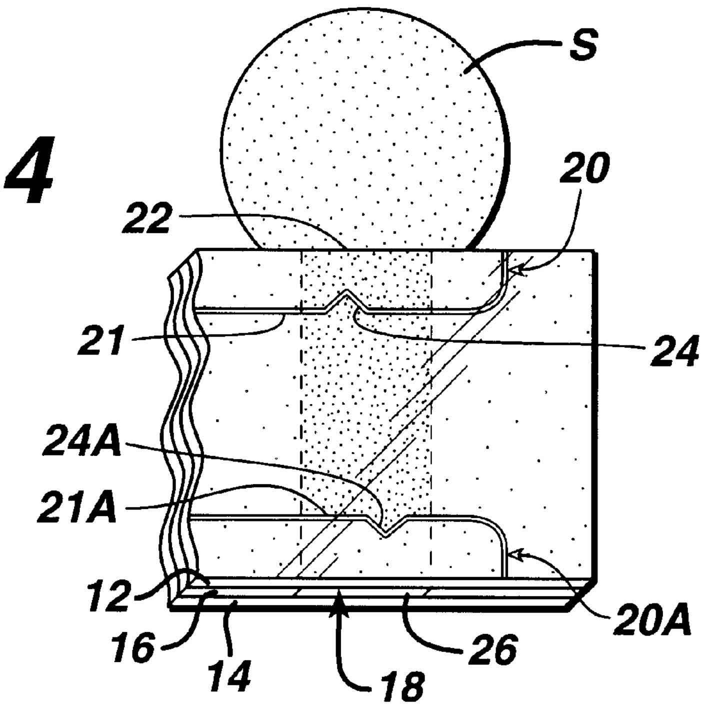
Figure 5:
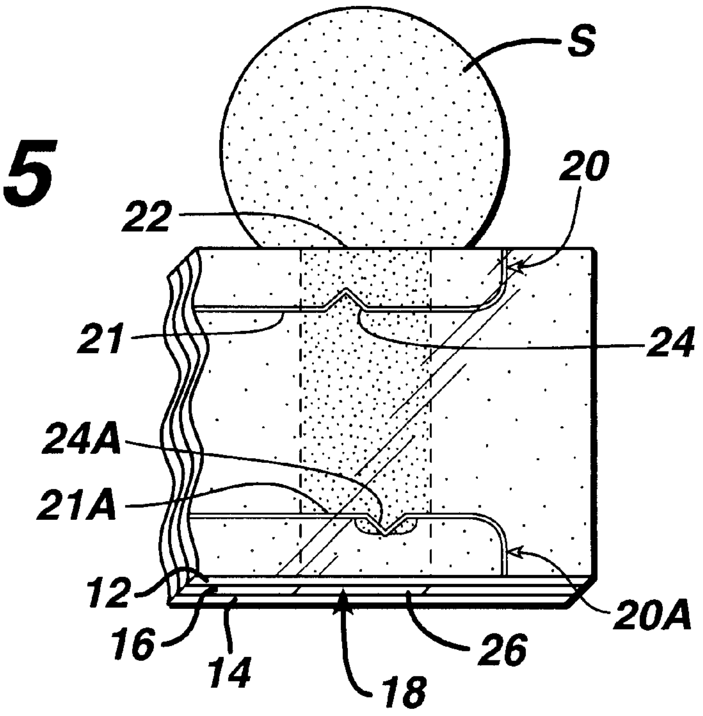

FIGS. 4 and 5 depict the flow of sample through channel 18 after it has broken through stop junction 21. In FIG. 4, the sample is stopped at stop junction 21A. In FIG. 5, sample has passed through stop junction 21A at its two ends. The breakthroughs occur there, because although the angles at the two ends are greater than 90°, they are smaller than the angle (i.e., the supplement of the angle that points toward 26) at the center of serration 24A. A short time after the sample reaches the position shown in FIG. 5, the sample will pass through stop junction 21A across the entire width of channel 18.

Figure 6:
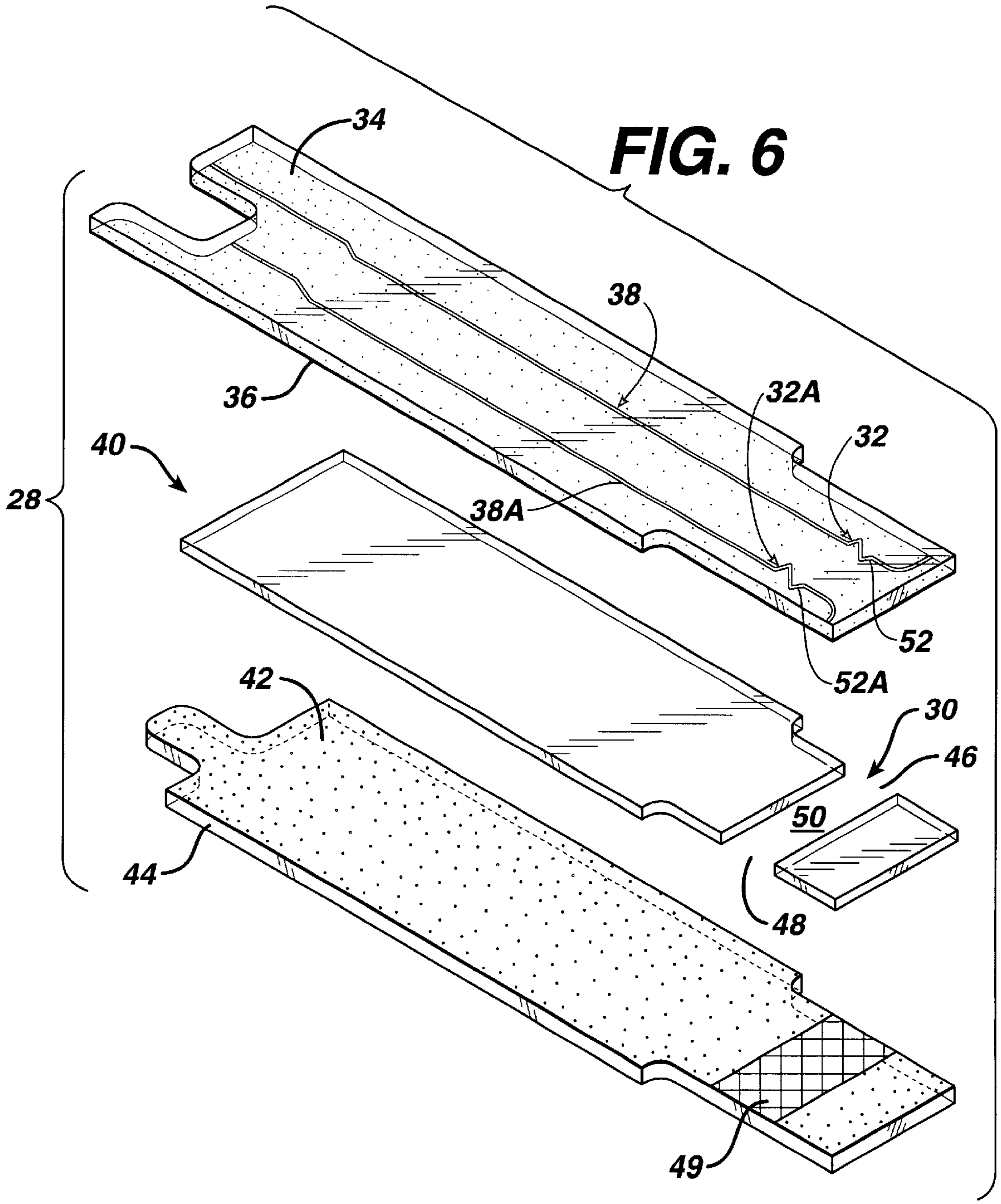
FIG. 6 is an exploded perspective view of a device of this invention.
Figure 7:
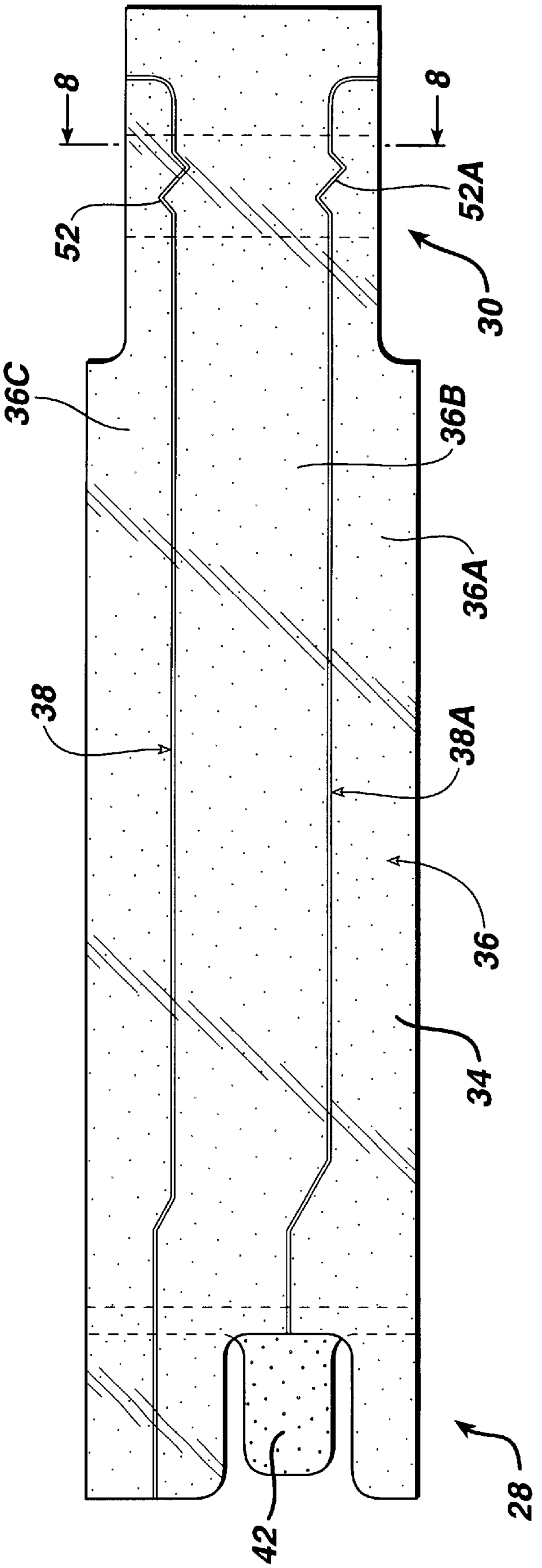
FIG. 7 is a plan view of the device of FIG. 6.

FIG. 6 depicts an exploded view of a device 28 for measuring the analyte concentration of a biological fluid that incorporates a capillary flow channel 30 and stop junctions 32 and 32A of the present invention. Top insulating sheet 34 has an electrically conductive surface 36, which is typically a metal, plated on a surface of insulating sheet 34 by vacuum deposition, sputtering, electroplating, or any other suitable method for providing a conductive surface, well known in the art. In from the longitudinal edges of surface 36 are scored insulating lines 38 and 38A. Scored lines 38 and 38A extend through the thickness of surface 36, on the underside of sheet 34, to provide gaps in the conductive path across the width of the device.

Intermediate insulating layer 40 is sandwiched between conductive surface 36 of top insulating sheet 34 and conductive surface 42 of bottom insulating sheet 44. Intermediate layer 40 is preferably a thermoplastic sheet with adhesive on both surfaces for adhering to sheets 34 and 44. Cutout channel 30 in intermediate layer 40 provides—between conductive-coated sheets 34 and 44—first end 46, second end 48, and an electrochemical cell 50 that lies between the two ends. Within capillary channel 30, a dry reagent coating 49, consisting of buffer, mediator, and enzyme, is shown on conductive surface 42. Alternatively, reagent coating 49 could be deposited on conductive surface 36 instead of, or in addition to, surface 42. Electrochemical cell 50 is the region within which is measured an electrical parameter of the fluid/reagent combination. The region in which the reagent is coated generally, but not necessarily, corresponds to the cell 50. The reagent and electrochemical cell 50 may be limited to the region within channel 30 and between scored lines 38 and 38A. Alternatively, the reagent coating (and cell) may extend over the entire cutout region between the edges of the device.

FIG. 7 is a top plan view of the device of FIG. 6. It is clear from FIG. 7 that scored lines 38 and 38A divide conductive surface 36 into three regions—36A, 36B, and 36C—each insulated from the other two. The purpose of scored lines 38 and 38A is to permit electrical monitoring of the filling of channel 30 by an electrically conductive biological fluid sample. By monitoring the electrical resistance between adjoining conductive regions, such as 36A, 36B, or 36C, 36B, one can determine when the sample bridges the scored line 38 or 38A that lies between the regions. Scored lines 38 and 38A form stop junctions in channel 30 and would stop flow, as shown in FIG. 1, but for serrations 52 and 52A. Note that serrations 52 and 52A form angles that point both to first end 46 and second end 48 of channel 30. Thus, unlike the "single" serrations in stop junctions shown in FIGS. 2–5, the serrations in stop junctions 32 and 32A each facilitate sample flow in both directions; i.e., whether sample enters first end 46 or second end 48.

Figure 8:
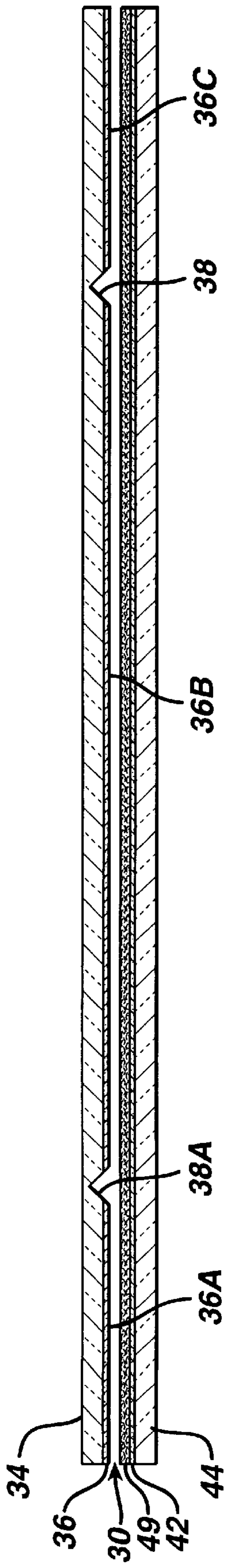
FIG. 8 is a cross section through the device of FIG. 7.

FIG. 8 is a cross section along the line 8—8 of FIG. 7. As is clear from FIG. 8, scored lines 38 and 38A interrupt conductive surface 36 and extend into insulating sheet 34. Conductive surface 36 is typically gold, and conductive surface 42 is typically palladium, but each may alternatively be any other conductive material that does not react with the reagent or sample and that can be applied to an insulating surface. Additional details regarding electrochemical monitoring of analyte concentrations, using the device of FIGS. 6, 7, and 8 appear in copending U.S. application Ser. No. 09/540,319 (still pending), incorporated herein by reference.

I claim:

1. A medical diagnostic device for measuring an analyte concentration of a biological fluid, comprising a capillary flow channel within the device, in fluid communication with a sample inlet, the flow channel a) adapted for conveying a sample of the biological fluid in a first direction, from a first region, proximate to the sample inlet, to a second region, distal to the sample inlet, the first region having a capillary dimension in a second direction, substantially perpendicular to the first direction; and b) having a stop junction, comprising a boundary region that i) separates the first and second regions, ii) has a predetermined dimension in the second direction that is greater than the capillary dimension, and iii) forms an angle that points toward the first region.

2. The device of claim 1, further comprising, in the second region, a measurement area, in which is measured a physical parameter of the sample that is related to the analyte concentration of the fluid.

3. The device of claim 2, in which the device comprises a first layer and a second layer, separated in the second direction by an intermediate layer, in which a cutout in the intermediate layer forms, with the first and second layers, the sample inlet, measurement area, and flow channel.

4. The device of claim 3, in which the second region has a dimension in the second direction that is substantially the same as the capillary dimension.

5. The device of claim 4, in which the boundary region comprises a pattern scored into the surface of the first layer.

6. The device of claim 3, in which the biological fluid is electrically conductive, the first and second layers each have a conductive surface adjoining the intermediate layer, which is an insulating layer, and the flow channel further comprises a) a dry reagent on the conductive surface of one of the layers for reacting with the sample to yield a change in an electrical parameter that can be related to the analyte concentration of the fluid; and b) an electrochemical cell, within which the electrical parameter is measured, and the stop junction comprises an insulating pattern scored into the conductive surface of one of the layers, whereby sample that flows across the pattern provides a conductive path from the first region to the second region.

7. The device of claim 6, further comprising a second sample inlet, for introducing sample to a third region of the device, the third region being in fluid communication with the second region, whereby fluid introduced into the first sample inlet travels in a substantially opposite direction to fluid introduced into the second sample inlet.

8. The device of claim 7, in which the boundary region forms a serrated pattern, having angles pointing toward both sample inlets.

9. The device of claim 1, further comprising a second sample inlet, for introducing sample to a third region of the device, the third region being in fluid communication with the second region, whereby fluid introduced into the first sample inlet travels in a substantially opposite direction to fluid introduced into the second sample inlet.

10. The device of claim 9, in which the boundary region forms a serrated pattern, having angles pointing toward both sample inlets.

* * * * *